United States Patent
Raby et al.

(10) Patent No.: US 7,909,957 B2
(45) Date of Patent: Mar. 22, 2011

(54) PROCESS FOR PRODUCING AN OPTICAL RECORDING MEDIUM WITH SEVERAL STAGES AND MEDIUM OBTAINED THEREBY

(75) Inventors: Jacques Raby, Grenoble (FR); Alain Fargeix, Meylan (FR); Marc Plissonnier, Eybens (FR); Marine Ruty, Echirolles (FR)

(73) Assignees: Commissariat A l'Energie Atomique, Paris (FR); MPO International, Averton (FR)

( * ) Notice: Subject to any disclaimer, the term of this patent is extended or adjusted under 35 U.S.C. 154(b) by 924 days.

(21) Appl. No.: 11/597,355

(22) PCT Filed: May 17, 2005

(86) PCT No.: PCT/FR2005/001236
§ 371 (c)(1),
(2), (4) Date: Nov. 21, 2006

(87) PCT Pub. No.: WO2006/005827
PCT Pub. Date: Jan. 19, 2006

(65) Prior Publication Data
US 2008/0274323 A1 Nov. 6, 2008

(30) Foreign Application Priority Data
Jun. 10, 2004 (FR) .................................... 04 06305

(51) Int. Cl.
*B32B 3/02* (2006.01)
(52) U.S. Cl. .................. 156/273.3; 156/272.2; 156/289
(58) Field of Classification Search ............. 156/272.2, 156/273.3, 152, 289
See application file for complete search history.

(56) References Cited

U.S. PATENT DOCUMENTS

| | | | | |
|---|---|---|---|---|
| 4,716,063 | A * | 12/1987 | Uehara et al. | 428/65.1 |
| 5,126,996 | A | 6/1992 | Iida et al. | |
| 6,500,511 | B1 * | 12/2002 | Ooki et al. | 428/64.1 |
| 6,599,385 | B1 | 7/2003 | Liao et al. | |
| 2003/0075434 | A1 * | 4/2003 | Voser et al. | 204/241 |
| 2003/0098119 | A1 * | 5/2003 | Yang et al. | 156/242 |
| 2003/0179693 | A1 | 9/2003 | Ootera | |
| 2004/0219326 | A1 | 11/2004 | Komaki et al. | |

FOREIGN PATENT DOCUMENTS

| | | |
|---|---|---|
| EP | 0 368 442 | 5/1990 |
| JP | 05143981 A * | 6/1993 |
| JP | 11291260 A * | 10/1999 |
| WO | WO 03/032306 | 4/2003 |

* cited by examiner

Primary Examiner — Richard Crispino
Assistant Examiner — Daniel McNally
(74) Attorney, Agent, or Firm — Oliff & Berridge, PLC

(57) ABSTRACT

The recording medium comprises at least a first (L1) and a second (L2) micro-structured stage assembled by an adhesive layer (4) and arranged between micro-structured bottom (2) and top substrates. A polymerizable layer forming the adhesive layer (4) is deposited on the first stage (L1). Then a micro-structured transparent matrix (5) is provisionally placed on the adhesive layer (4) so as to micro-structure the adhesive layer (4). Polymerization of the adhesive (4) is performed by exposure, through the matrix (5), with a polymerization light. Then the matrix (5) is removed and the second stage (L2) is deposited on the micro-structured adhesive layer (4). Then an additional adhesive layer (9) is deposited on the second stage (L2) and the micro-structured matrix (5) is definitively placed on the additional adhesive layer (9) so as to form the top substrate.

11 Claims, 3 Drawing Sheets

PROCESS FOR PRODUCING AN OPTICAL RECORDING MEDIUM WITH SEVERAL STAGES AND MEDIUM OBTAINED THEREBY

BACKGROUND OF THE INVENTION

The invention relates to a process for producing a recording medium comprising at least a first and a second micro-structured stage assembled by an adhesive layer and arranged between micro-structured bottom and top substrates, process comprising, after deposition on the first stage of a polymerizable layer forming the adhesive layer,
- provisional placing on the adhesive layer of a micro-structured matrix, transparent to a light designed to perform polymerization of the adhesive layer, so as to micro-structure the adhesive layer,
- polymerization of the adhesive by exposure, through the matrix, with a polymerization light,
- removal of the matrix,
- deposition of the second stage on the micro-structured adhesive layer.

STATE OF THE ART

Two-stage optical recording media of the Digital Versatile Disc (DVD) type can store 8.5 GBytes of information. These media are formed by a stacking of layers typically arranged between two substrates.

The documents US2003/0179693 and U.S. Pat. No. 6,599,385 describe a recording medium comprising a first and second micro-structured stage assembled by an adhesive layer and arranged on a micro-structured bottom substrate. Each of the stages comprises several layers, in particular an active memory layer. Structuring of the different layers is achieved by means of a matrix able to be made of metal or polymer. Stacking is then completed by a top substrate identical or not to the bottom substrate.

OBJECT OF THE INVENTION

It is an object of the invention to remedy these shortcomings and, in particular, to propose a process for producing a recording medium at low cost.

According to the invention, this object is achieved by the appended claims and in particular by the fact that the process comprises:
- deposition of an additional adhesive layer on the second stage,
- final placing of the micro-structured matrix on the additional adhesive layer so as to form the top substrate.

It is also an object of the invention to provide a recording medium fabricated by the process according to the invention and successively comprising:
- the micro-structured bottom substrate,
- the micro-structured first stage,
- the adhesive layer,
- the micro-structured second stage,
- the additional adhesive layer, and
- the micro-structured top substrate.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
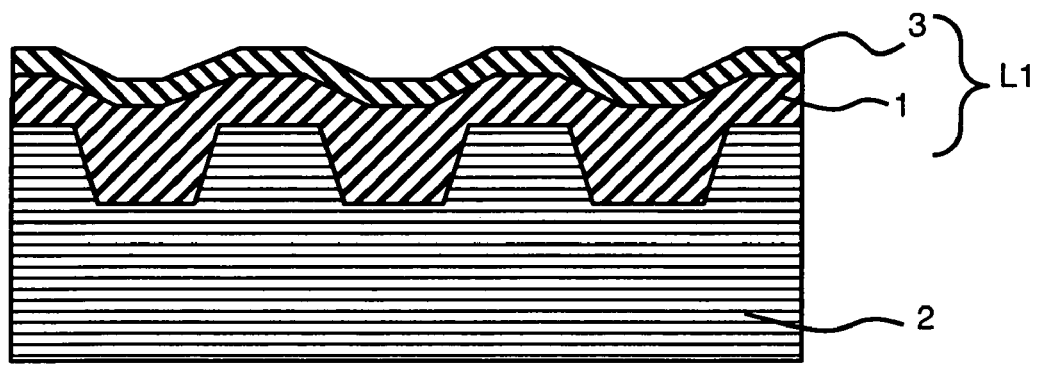
FIGS. 1 to 5 represent different steps of a particular embodiment of a process for producing a recording medium according to the invention, having two stages.

In FIG. 1, a first active layer 1 is deposited on a front face of a micro-structured substrate 2 by a predetermined pattern. The active layer 1 is formed by a memory material able to undergo transformations in the course of a write phase of the optical recording medium. The substrate 2 typically has a thickness of about 0.6 mm and can be fabricated by thermo-injection of a polymer material in a structured nickel mould obtained by electrochemical means. The first active layer 1 can be formed by an organic material, for example by a colorant. In the particular embodiment represented in the figures, a first semi-reflecting film 3 is deposited on the front face of the first active layer 1. The first active layer 1 and the first semi-reflecting film 3 form a first recording level or stage L1 of the recording medium.

Figure 2:
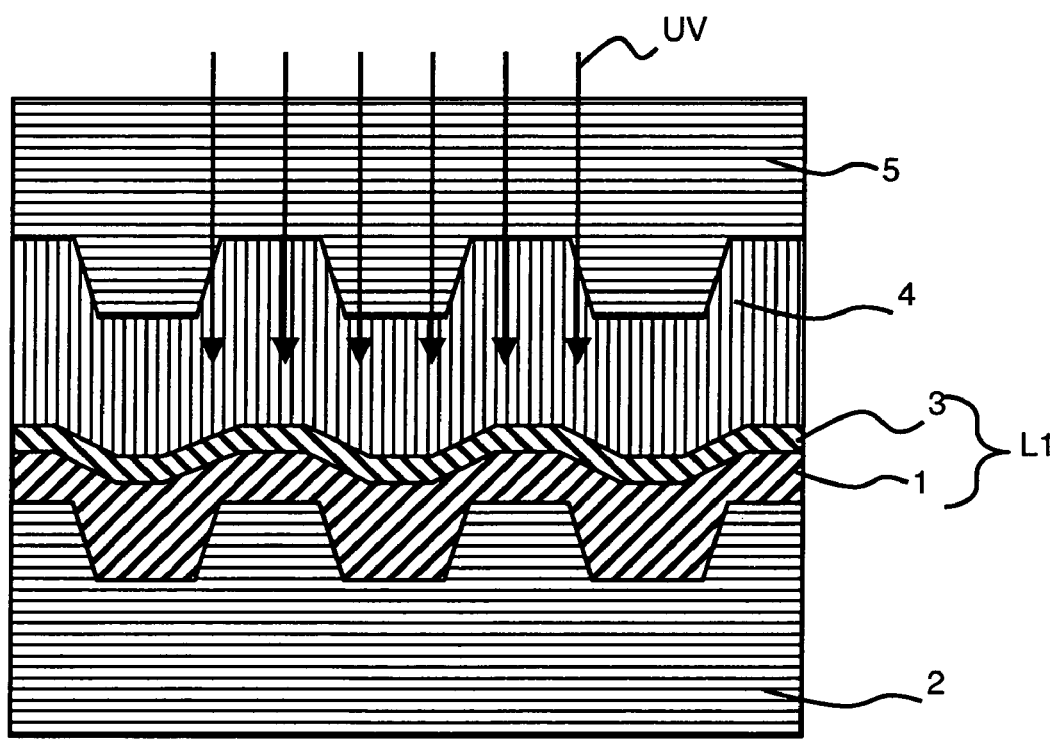

As represented in FIG. 2, a layer of polymerizable material forming an adhesive layer 4, for example made from photo-polymerizable resin, is deposited on the first semi-reflecting film 3. The adhesive layer 4 of the recording medium must be transparent so as to transmit light during the information read and/or write phases. The adhesive layer 4 can be achieved by deposition of a resin bead on the semi-reflecting film 3, followed by spreading of the resin by centrifugal force on a spin-whirler to achieve the required thickness. Then a matrix 5, micro-structured by a pattern which may be identical to the pattern of the substrate 2, is provisionally placed on the adhesive layer 4 and pressed against the layer 4 to transfer its pattern to the adhesive layer 4. The matrix 5 and the bottom substrate 2 are preferably made from the same material.

Polymerization of the adhesive 4 is then performed by exposure, through the matrix 5, with a polymerization light, for example ultraviolet UV light represented by parallel arrows in FIG. 2. Fabrication of the micro-structured adhesive layer 4 can be performed at atmospheric pressure and at ambient temperature.

The matrix 5 must be transparent to the UV light designed to cause polymerization of the adhesive layer 4. The matrix 5 can be fabricated previously by thermo-injection of a polymer material in a mould. The thickness of the matrix 5 is preferably equal to the thickness of the substrate 2, for example about 0.6 mm.

Figure 3:
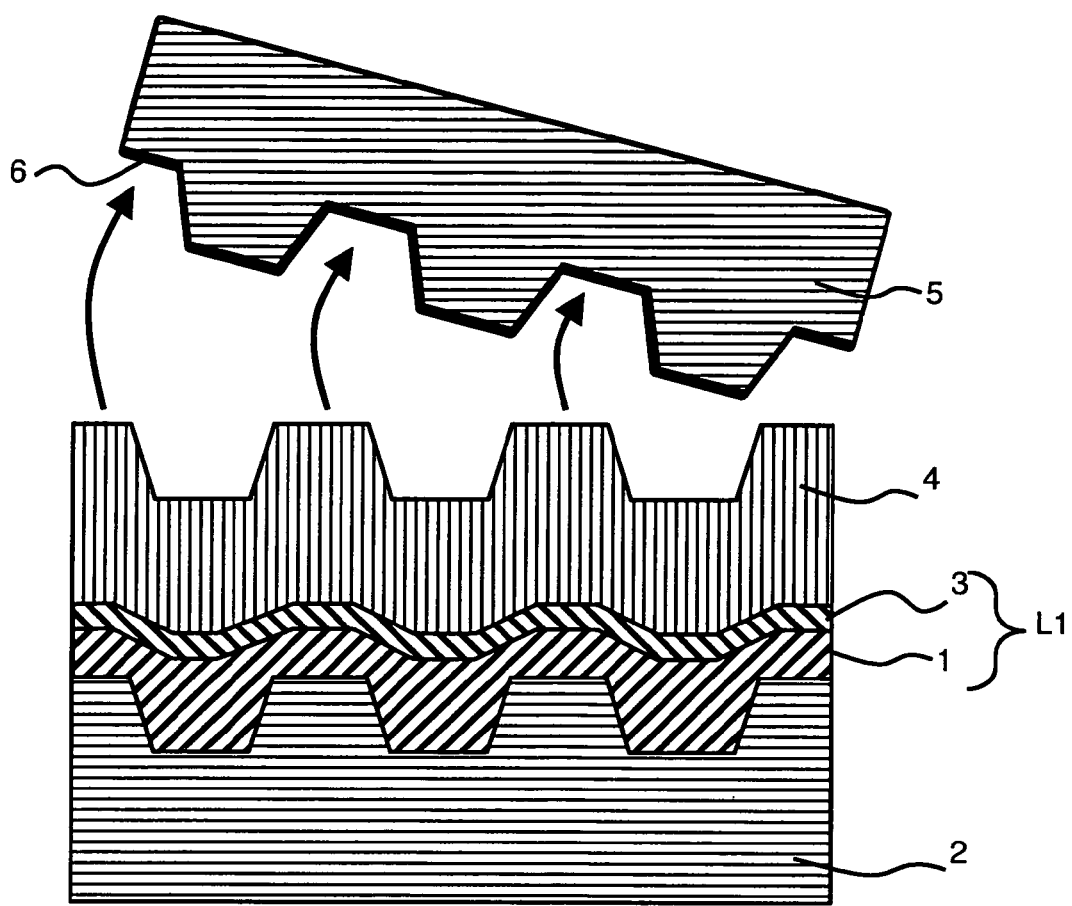

After polymerization, the matrix 5 is removed, as illustrated in FIG. 3. As the adhesive layer 4 is polymerizable, it keeps the micro-structured shape defined by the matrix 5. To make it easier to separate the matrix 5 from the adhesive layer 4, the process can comprise surface treatment of the micro-structured matrix 5, before the matrix 5 is placed in position. The surface treatment enables at least a part of the surface of the micro-structured matrix to be made anti-adhesive, in particular the part which is designed to come into contact with the adhesive layer 4, for example a micro-structured face of the matrix 5.

The matrix 5 can be treated, for example by plasma, in order to obtain deposition of a thin film 6 of anti-adhesive material, for example a hydrophobic material. The anti-adhesive material can present a low surface energy or a low surface tension. Deposition of the anti-adhesive thin film 6 can be performed at ambient temperature, for example by plasma enhanced chemical vapor deposition (PECVD). Plasma treatment enables apolar functional chemical groups to be created at the surface of the material of the matrix 5 which reduce the wettability of the surface. The plasma can comprise silicon, oxygen and carbon based compounds (SiOC). A thin film 6 of dense polymer material can be deposited by plasma polymerization. The use of organosiloxane or fluorine monomers, for example $C_4F_8$ or $SF_6$, enables a film with a very low surface energy to be obtained, having for example a thickness comprised between 5 nm and 30 nm and able to be deposited with a deposition rate of about 5 nm/s. The process can also comprise a surface activation step of the micro-structured adhesive layer 4, for example by oxidizing plasma in a vacuum or by irradiation by ultraviolet light in ozone at atmospheric pressure.

Contact angle measurements performed on a polycarbonate substrate having undergone a plasma treatment comprising silicon and/or carbon- and fluorine-based compounds have in fact shown a reduction of the wettability of the substrate by polar liquids like certain polymerizable resins which can be used by the adhesive layer 4.

Further to the objective of facilitating separation of the matrix 5 from the adhesive layer 4, deposition of a thin anti-adhesive film 6 must enable the micro-structured pattern to be transferred from the matrix 5 to the adhesive layer 4. Atomic force microscope measurements do in fact show that the pattern is preserved after deposition of a thin film of anti-adhesive material with a thickness of 30 nm.

The process can comprise, after the matrix 5 has been removed, a surface treatment neutralization step enabling the matrix 5 to be subsequently reused, in particular to fix the matrix onto another adhesive layer as described above. Neutralization can for example be performed by means of an oxidizing plasma in a vacuum or irradiation by ultraviolet light in ozone or creating ozone, advantageously in an ambient atmosphere, enabling a hydrophobic surface to be made hydrophilic and to thus ensure final adhesion of the matrix.

Figure 4:
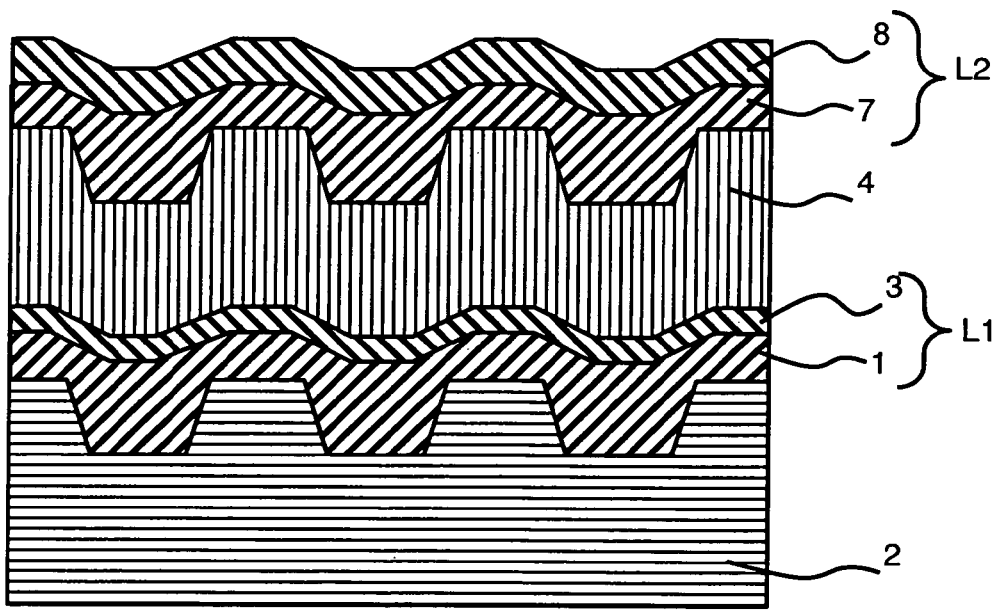

As represented in FIG. 4, a second recording stage L2 is then deposited on the micro-structured adhesive layer 4. The adhesive layer 4 thus enables the first recording stage L1 and the second recording stage L2 to be assembled. In the particular embodiment represented in FIG. 4, the second stage L2 is formed by a second active layer 7 having for example the same properties as the first active layer, and by a second semi-reflecting film 8, typically thicker than the first semi-reflecting film 3.

Figure 5:
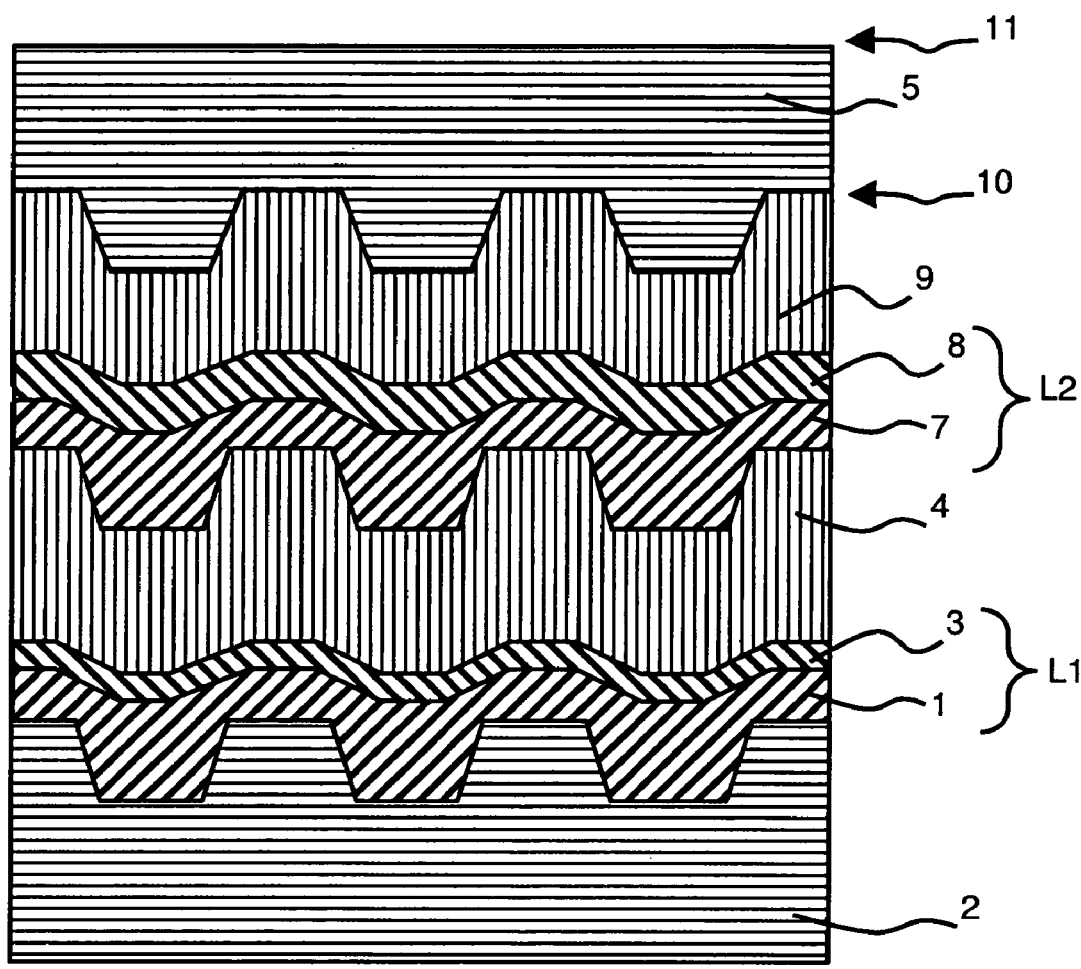

As represented in FIG. 5, an additional adhesive layer 9 is deposited on the second semi-reflecting film 8. Then the matrix 5 is placed on the additional adhesive layer 9 and pressed against the additional adhesive layer 9 to fix the matrix 5 definitively onto the additional adhesive layer 9 by exposure to ultraviolet light. The matrix 5 thus forms a top substrate having a protection function of the recording medium.

In FIG. 5, the matrix 5 comprises a micro-structured face 10 and a flat opposite face 11. Final placing of the matrix 5 can be performed by bringing the flat face 11 into contact with the additional adhesive layer 9, in particular in the case where the micro-structured face 10 comprises an anti-adhesive coating or film 6 possibly preventing final placing of the matrix 5 on the additional adhesive layer 9. In FIG. 5, the micro-structured face 10 no longer comprises an anti-adhesive film and final placing of the matrix is performed by bringing the micro-structured face 10 into contact with the additional adhesive layer 9, followed by polymerization by exposure to ultraviolet light.

The use of a matrix 5 as top substrate enables material losses to be avoided. The matrix 5 will in fact only be able to be used a limited number of times for polymerization steps under light exposure. In the case of the process according to the invention, a new matrix is used for each recording medium.

The matrix 5 is preferably formed by the same material as the substrate 2. The matrix 5 and substrate 2 are thus preferably thermoplastic polymer material based and, more particularly, made from polycarbonate, polymethylmetacrylate (PMMA) or cyclo-olefine based copolymers and polymers. Fabrication of the matrix 5 is preferably strictly identical to fabrication of the substrate 2 so as to be able to use a single equipment line.

The invention is not limited to the embodiments represented. In particular, the medium can comprise three stages or more (L3, L4, etc.). Thus, in a similar way to the previous process, before final placing of the micro-structured matrix 5, the process comprises provisional placing of the micro-structured matrix 5 on the additional adhesive layer 9 so as to micro-structure the additional adhesive layer 9, which is deposited on the previous stage and which must, in this case, be polymerizable. Then the adhesive 9 is polymerized by exposure, through the 15 matrix with a polymerization UV light and the matrix 5 is removed. Then an additional layer (L3) is deposited on the micro-structured adhesive layer 9 and a final additional adhesive layer 9 is deposited on the additional stage (L3) and the micro-structured matrix 5 is definitively placed.

The invention claimed is:

1. Process for producing a recording medium comprising at least a first and a second micro-structured stage assembled by an adhesive layer and arranged between micro-structured bottom and top substrates, the process comprising:
    deposition on the first stage of a polymerizable layer forming the adhesive layer,
    provisional placing on the adhesive layer of a single micro-structured matrix, the single micro-structured matrix being transparent to a light designed to perform polymerization of the adhesive layer, so as to micro-structure the adhesive layer,
    polymerization of the adhesive by exposure, through the single micro-structured matrix, with a polymerization light,
    removal of the single micro-structured matrix,
    deposition of the second stage on the micro-structured adhesive layer,
    deposition of an additional adhesive layer on the second stage, and
    final placing of the single micro-structured matrix on the additional adhesive layer so as to form the top substrate,
    wherein the process further comprises:
        a surface treatment of the single micro-structured matrix enabling at least a part of a surface of the single micro-structured matrix to be made anti-adhesive, the surface treatment of the single micro-structured matrix being performed before the provisional placing on the adhesive layer of the single micro-structured matrix, and
        a neutralization step of the surface treatment of the single micro-structured matrix before the final placing of the single micro-structured matrix on the additional adhesive layer, the neutralization step of the surface treatment of the single micro-structured matrix being performed by application of an oxidizing plasma in a vacuum.

2. Process according to claim 1, wherein the single micro-structured matrix comprises a micro-structured face and an opposite flat face.

3. Process according to claim 2, wherein final placing of the single micro-structured matrix is performed by bringing the flat face into contact with the additional adhesive layer.

4. Process according to claim 2, wherein final placing of the single micro-structured matrix is performed by bringing the micro-structured face into contact with the additional adhesive layer.

5. Process according to claim 1, wherein the single micro-structured matrix and the bottom substrate are made of the same material.

6. Process according to claim 1, further comprising:
   before final placing of the single micro-structured matrix, provisional placing of the single micro-structured matrix on the additional adhesive layer deposited on the second stage so as to micro-structure the additional adhesive layer,
   polymerization of the additional adhesive layer by exposure, through the single micro-structured matrix, with a polymerization light,
   removal of the micro-structured matrix,
   deposition of an additional stage on the micro-structured additional adhesive layer, and
   deposition of another additional adhesive layer on the additional stage.

7. Process according to claim 1, wherein the surface treatment comprises deposition of an anti-adhesive thin film.

8. Process according to claim 1, wherein the surface treatment enables the surface of the single micro-structured matrix to be made hydrophobic.

9. Process according to claim 1, further comprising a surface activation step of the micro-structured adhesive layer, performed by a means chosen from among oxidizing plasmas in a vacuum and irradiations by ultraviolet light in ozone at atmospheric pressure.

10. Process according to claim 1, wherein the first and second stages each consist of
   an active layer; and
   a semi-reflecting layer deposited on the active layer, wherein the adhesive layer is deposited on the semi-reflecting layer of the first stage, and the additional adhesive layer is deposited on the semi-reflecting layer of the second stage.

11. Process for producing a recording medium comprising at least a first and a second micro-structured stage assembled by an adhesive layer and arranged between micro-structured bottom and top substrates, the process comprising:
   deposition on the first stage of a polymerizable layer forming the adhesive layer,
   provisional placing on the adhesive layer of a single micro-structured matrix, the single micro-structured matrix being transparent to a light designed to perform polymerization of the adhesive layer, so as to micro-structure the adhesive layer,
   polymerization of the adhesive by exposure, through the single micro-structured matrix, with a polymerization light,
   removal of the single micro-structured matrix,
   deposition of the second stage on the micro-structured adhesive layer,
   deposition of an additional adhesive layer on the second stage, and
   final placing of the single micro-structured matrix on the additional adhesive layer so as to form the top substrate,
   wherein the process further comprises:
      a surface treatment of the single micro-structured matrix enabling at least a part of a surface of the single micro-structured matrix to be made anti-adhesive, the surface treatment of the single micro-structured matrix being performed before the provisional placing on the adhesive layer of the single micro-structured matrix, and
      a neutralization step of the surface treatment of the single micro-structured matrix before the final placing of the single micro-structured matrix on the additional adhesive layer, the neutralization step of the surface treatment of the single micro-structured matrix being performed by irradiations by ultraviolet light in ozone at atmospheric pressure.

* * * * *